No. 798,128. PATENTED AUG. 29, 1905.
E. BUTTS.
GATE.
APPLICATION FILED FEB. 14, 1905.
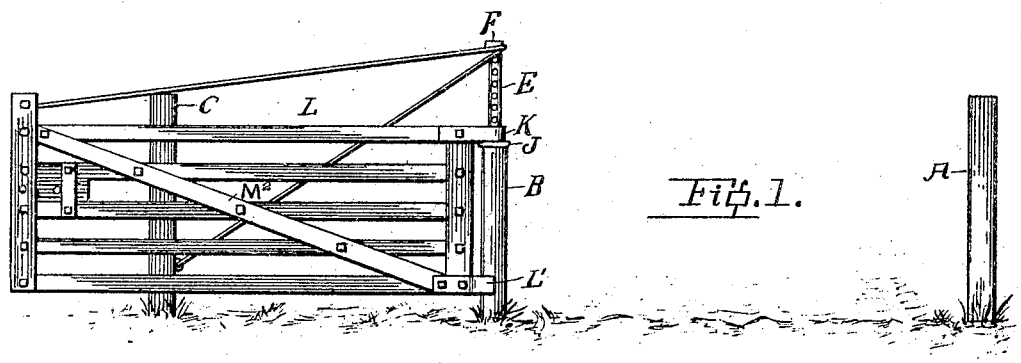
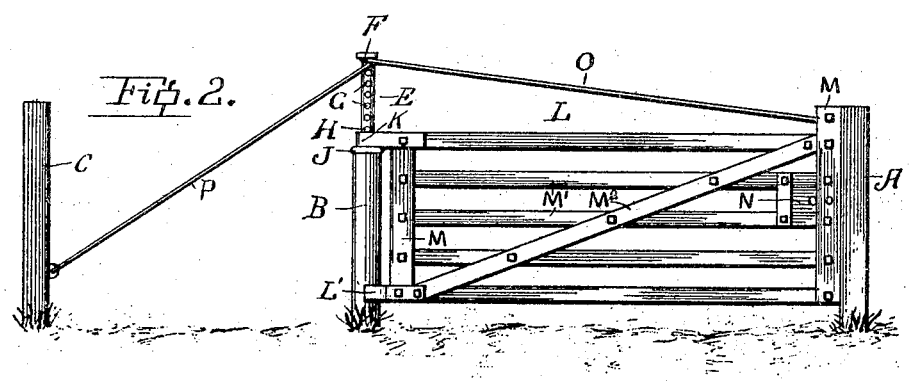
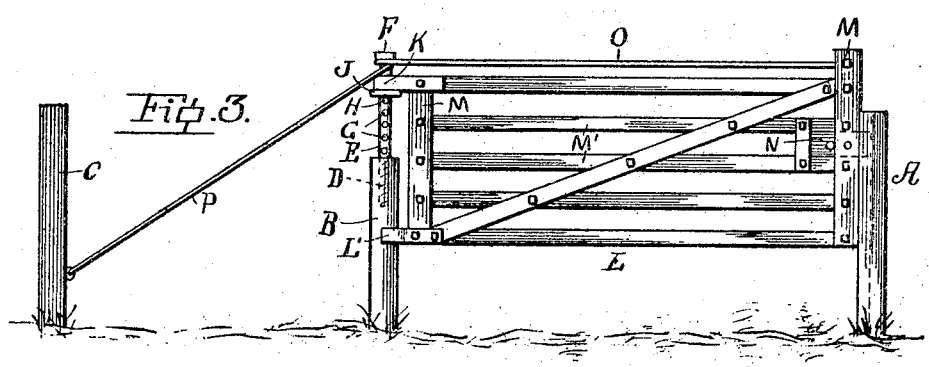
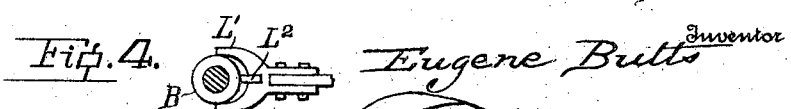
Witnesses
J. H. Burgess
Philip S. McLean.
Inventor
Eugene Butts
By Wm. N. Moore
Attorney

UNITED STATES PATENT OFFICE.

EUGENE BUTTS, OF EVANSVILLE, WISCONSIN.

GATE.

No. 798,128.        Specification of Letters Patent.        Patented Aug. 29, 1905.

Application filed February 14, 1905. Serial No. 245,807.

*To all whom it may concern:*

Be it known that I, EUGENE BUTTS, a citizen of the United States, residing at Evansville, in the county of Rock and State of Wisconsin, have invented certain new and useful Improvements in Gates, of which the following is a specification.

My invention relates to improvements in gates; and one object of my invention is the provision of a gate which will be particularly useful as a farm-gate, and which will be capable of easy opening and closing, and which can be adjusted to any desired height for the purpose of clearing the ground of any obstruction or for permitting the passage under the gate of small stock or poultry.

Another object of my invention is the provision of a swinging farm-gate which will be of the simplest, cheapest, and most durable construction, and which will dispense with the usual form of hinges and prevent sagging, and which generally will be desirable and practical in every particular.

With these objects in view my invention consists of a farm-gate embodying novel features of construction and combination of parts, substantially as disclosed herein.

Figure 1 is a side elevation of my gate, shown in open position. Fig. 2 is a similar view, the gate being closed. Fig. 3 is a side elevation with the gate raised or adjusted to clear the ground or permit small stock or poultry to pass under the gate. Fig. 4 is a detail view of the lower hinge.

In the drawings the letter A designates the latch-post, the letter B designates the hinge-post, and C designates the road or, in this case, the gate-limiting or abutment post. The hinge-post comprises a tubular metal post, provided in its upper portion with screw-threads D, with which engages the screw-threaded lower end of the circular rod or standard E, the upper end of which is provided with a cap F. This standard is formed with a series of openings G, adapted to receive a pin H, which retains the collar J on said standard, said collar supporting the bail or loop $k$, which is connected to the upper portion of the gate L. To the lower portion of the gate is connected the fork L', which snugly fits against the tubular hinge-post and in connection with the loop forms the hinge for the gate. In the form shown in Fig. 4 the fork is provided with a roller $L^2$, which permits of easy travel of the fork on the tubular post.

The gate consists of the vertical stiles M, the parallel rails M', and the inclined brace-rails $M^2$, the structure forming a simple, strong, and durable gate, and a sliding keeper or latch N is provided, which when the gate is closed engages the latch-post and prevents accidental or improper opening of the gate. Extending from the road-post to the top of the standard is the bracing-rod O, and from the top of the standard to the outer vertical stile extends the bracing-rod P.

It will be apparent from the description and drawings that I provide a gate which possesses merit in point of simplicity and cheapness of construction, which is very strong and durable, which can be easily opened and closed, and which cannot possibly sag, and which can be quickly and easily adjusted to clear a pile or obstruction or permit the passage of poultry or small stock, thus insuring a useful and practical gate.

I claim—

1. A gate consisting of the tubular hinge-post, the standard screwed into said tubular post and provided with a series of vertically-disposed openings, a gate having a closed loop fitting on the standard and a fork fitting on the tubular post, whereby the gate may be swung and adjusted vertically and a pin fitting in one of the openings of the standard and engaging the closed loop to retain the gate in vertical adjustment.

2. A gate consisting of the latch-post, the tubular hinge-post and the bracing and abutment post, the standard fitting in the tubular post and provided with a vertical series of openings, the gate, the loop or strap hinge carried by the gate and engaging the standard, the fork or bifurcated plate carried by the gate and engaging the tubular post, and the bracing-rods leading from the post to the standard and from the standard to the gate.

In testimony whereof I affix my signature in presence of two witnesses.

EUGENE BUTTS.

Witnesses:
    GEO. E. SHAW,
    ALMON M. LIBBY.